(12) United States Patent
Yamamoto et al.

(10) Patent No.: US 6,445,432 B2
(45) Date of Patent: Sep. 3, 2002

(54) COLOR LIQUID CRYSTAL DISPLAY PANEL

(75) Inventors: Yuji Yamamoto; Mamoru Okamoto; Michiaki Sakamoto; Takahiko Watanabe; Hironori Kikkawa; Muneo Maruyama, all of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/765,896

(22) Filed: Jan. 18, 2001

(30) Foreign Application Priority Data

Jan. 21, 2000 (JP) ........................................ 2000-013571

(51) Int. Cl.$^7$ ...................... G02F 1/1368; G02F 1/1333
(52) U.S. Cl. ........................ 349/106; 349/110; 349/42
(58) Field of Search ............................. 349/42, 43, 78, 349/79, 80, 106, 110, 122, 138

(56) References Cited

U.S. PATENT DOCUMENTS

| 5,926,702 | A | * | 7/1999 | Kwon et al. | 438/158 |
| 5,994,721 | A | * | 11/1999 | Zhong et al. | 257/89 |
| 6,147,729 | A | * | 11/2000 | Kurauchi et al. | 349/106 |
| 6,211,939 | B1 | * | 4/2001 | Satou et al. | 349/192 |
| 6,287,733 | B1 | * | 9/2001 | Miyazaki et al. | 430/7 |

FOREIGN PATENT DOCUMENTS

| JP | 62-250416 | 10/1987 | ........... G02F/1/133 |
| JP | 63-173023 | 7/1988 | ........... G02F/1/133 |
| JP | 403237432 A | * | 10/1991 |
| JP | 405311109 A | * | 11/1993 |
| JP | 407281195 A | * | 10/1995 |
| JP | 411142882 A | * | 5/1999 |

OTHER PUBLICATIONS

Kim et al.; "Coplanar amorphous silicon thin film transistor fabricated by inductively coupled plasma chemical vapor deposition"; Journal of Applied Physics, vol. 84, No. 7, pp. 4006–4012 (1998).*

* cited by examiner

Primary Examiner—William L. Sikes
Assistant Examiner—Hoan C. Nguyen
(74) Attorney, Agent, or Firm—Hayes Soloway, P.C.

(57) ABSTRACT

First and second transparent substrates which are arranged to face each other are provided to a color liquid crystal display panel. A liquid crystal layer is provided between the first and the second transparent substrates. A plurality of thin film transistors are provided on the first transparent substrate. An insulation film provided on the first transparent substrate so as to cover the thin film transistors. A color filter which includes first to third color layers stacked on the insulation layer is provided. A contacting color layer is provided on the insulation film in a region above the thin film transistors. The contacting color layer has at least one color layer selected from a group of composed of the first to third color layers. A black matrix is provided on the contacting color layer. The black matrix has opening portions for transmitting light from the color filter.

20 Claims, 12 Drawing Sheets

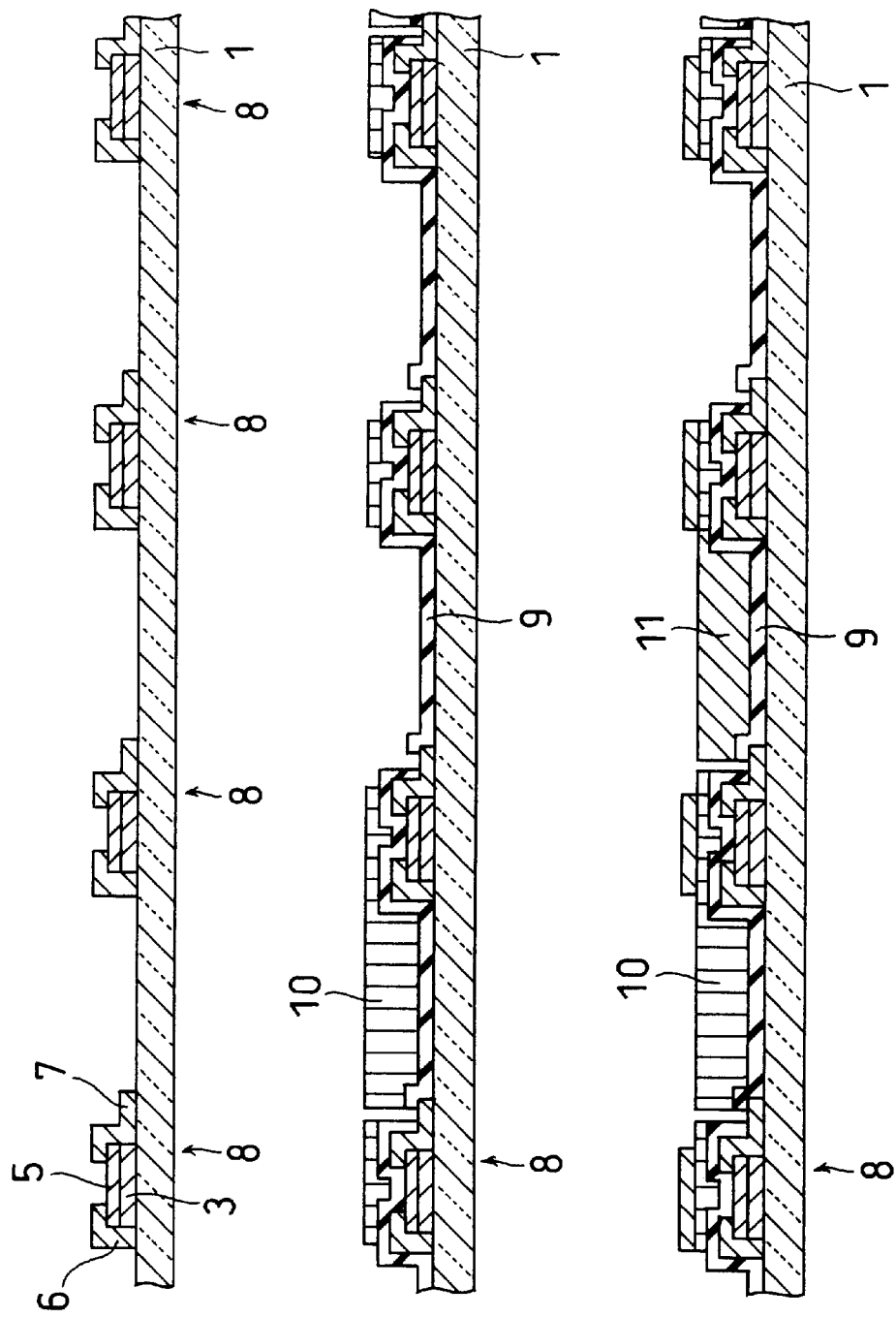

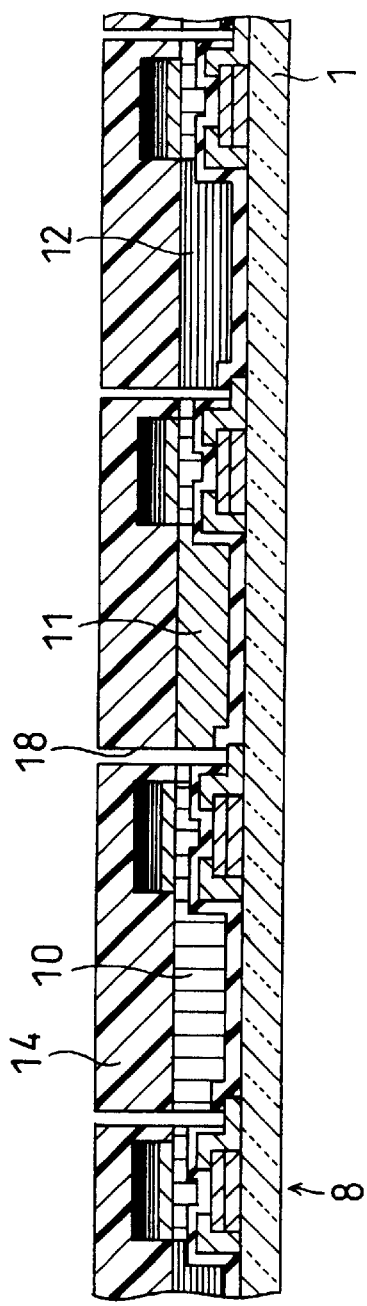
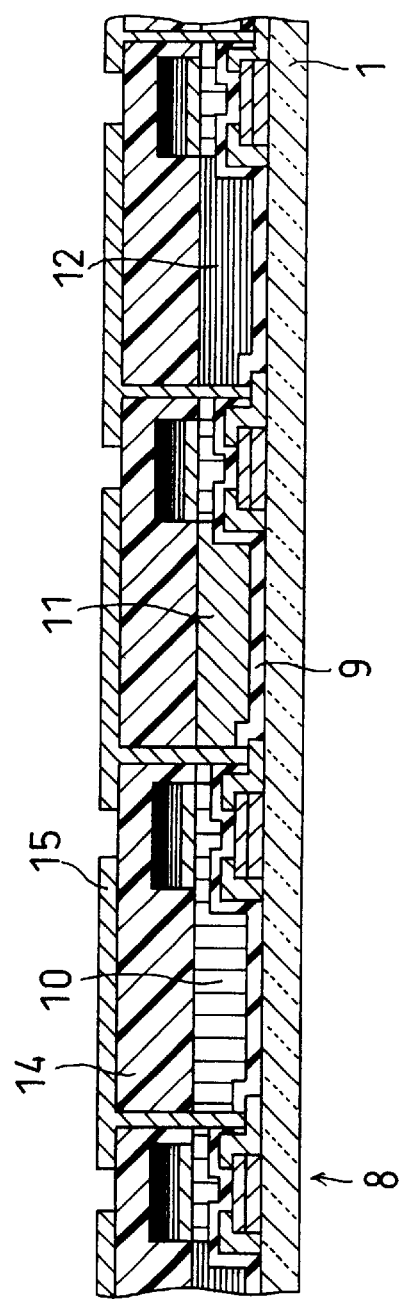
FIG. 3F
FIG. 3G

COLOR LIQUID CRYSTAL DISPLAY PANEL

BACKGROUND OF THE INVENTION

1. Field of the Invention

The present invention relates to a color liquid crystal display panel which comprises thin film transistors, and more particularly, to a color liquid crystal display panel in which tight contact between a black matrix and an underlying member is improved so as to achieve high fineness.

2. Description of the Related Art

A color liquid crystal display panel comprises two glass substrates and a liquid crystal layer which is disposed between the glass substrates. In general, in a panel of the thin film transistor (TFT; Thin Film Transistor) type, color layers of three colors (red, green and blue) are formed on a counter glass substrate which is faced with a TFT-side glass substrate which seats TFTs. However, since such a structure demands large margins for a black matrix which is disposed between adjacent inter-pixel opening portions to improve contrast, it is difficult to enhance the fineness of the panel with this structure.

Against this background, a color liquid crystal display panel seating three color layers on a TFT-side substrate has attracted attention over recent years. FIG. 1 is a cross sectional view of a conventional color liquid crystal display panel in which three color layers are formed on a TFT-side substrate.

In a conventional color liquid crystal display panel, a liquid crystal layer 117 is disposed between a TFT-side glass substrate 101 and a counter glass substrate 102. In the following, the closer sides to the liquid crystal layer 117 of the glass substrates 101 and 102 will be referred to as "the inner sides" and the opposite sides will be referred to as "the outer sides."

Gate electrodes 103 are formed on an inner-side surface of the TFT-Side glass substrate 101, and a gate insulation film 104 is formed so as to cover the gate electrodes 103. The gate electrodes 103 are connected to gate lines (not shown) which extend in the direction of rows in the panel.

A semiconductor layer 105 is formed on an inner-side surface of the gate insulation film 104 at positions corresponding to the respective gate electrodes 103, and drain electrodes 106 and source electrodes 107 are formed so as to sandwich the semiconductor layer 105. The drain electrodes 106 are connected to signal lines (not shown) which extend in the direction of columns. On the other hand, the source electrodes 107 are intrinsic to the respective TFTs 108. In this manner, the plurality of TFTs 108 are arranged in the form of a matrix. Further, an insulation film 109 is formed entirely over the inner-side surface of the TFT-side glass substrate 101 so as to coat the TFTs 108.

A black resin layer (black matrix) 113 is formed on the respective TFTs 108 so as to sandwich the insulation layer 109 with the respective TFTs 108. The black resin layer 113 is formed also on the respective gate lines, the respective signal lines and a frame portion 120 of the panel so as to sandwich the insulation layer 109 with them.

At the inter-pixel opening portions from which the red light is to be emitted, a red layer 110 alone is disposed as a color layer on the insulation layer 109. At the inter-pixel opening portions from which the green light is to be emitted, a green layer 111 alone is disposed as a color layer on the insulation layer 109. At the inter-pixel opening portions from which the blue light is to be emitted, a blue layer (not shown) alone is disposed an a color layer on the insulation layer 109.

Still further disposed entirely on the inner-side surface of the TFT-side glass substrate 101 is a flattened film 114 which has a flattened surface and covers the TFTs 108, the black resin layer 113 and the like. The flattened film 114 includes a plurality of contact holes 118 which reach even to the respective source electrodes 107, and pixel electrodes 115 of an ITO film are formed inside the contact holes 118. The pixel electrodes 115 protrude beyond and extend on the flattened film 114, thereby covering the color layers at the respective inter-pixel opening portions.

Meanwhile, a counter transparent common electrode 116 is formed on the inner-side surface of the counter glass substrate 102 such that the counter transparent common electrode 116 stretches to face the respective pixel electrodes 115. The counter transparent common electrode 116 is formed of an ITO film.

A sealant 119 surrounding the liquid crystal layer 117 is disposed between the glass substrates 101 and 102 In addition, an alignment film (not shown) is formed on each of the flattened film 114 and the counter transparent common electrode 116.

In such a conventional color liquid crystal display panel, since the black matrix 113 is formed on the inner-side surface of the TFT-side glass substrate 101 it is possible to reduce the widths of the black matrix 113. As a result, it is possible to improve an opening ratio beyond that heretofore achievable. For example, an XGA panel can have an opening ratio of about 80%.

In the case of the conventional color liquid crystal display panel as above, in which the three color layers are formed on the TFT-side substrate, during fabrication of the panel, after applying, developing and baking on the respective color layers or before forming the respective color layers, a black resin film which is a raw material of the black matrix is applied, developed and baked. Since the width used under the optimal condition for development (development margin) of the black resin film is extremely narrow, there is a problem in that the black resin film easily falls off the insulation film 109 while being developed. The black resin film falls off because the black resin film at its surface portions absorbs light during patterning by photolithography and thus fails to be sensitized inside. Although improvement is possible to a certain extent if the black resin film is formed as a thin film, this solution leads to a new problem of lowered optical density. As an optical density, an OD value of 3.0 or higher is said to be necessary. Further, in an effort to increase an optical density, an increased carbon content results in a trade off in that a ratio of an acrylic component, which contributes to a tight contact with the underlying member, decreases and hence a contact capability decreases. In short, such stripping of the black resin film becomes particularly remarkable when the black matrix 113 is formed thick or the carbon content in the black matrix 113 is increased and the like. This is another problem in that it is difficult to enhance optical density, namely, light shielding capability for the purpose of obtaining excellent contrast. In contrast, in the case of a color filter, since light is transmitted even inside, sufficient sensitizing is possible.

Further, a color liquid crystal display panel which uses a laminated member of three color layers as a light shielding film has been proposed (Japanese Patent Laid-Open Publication No. Sho 62-250416). However, even if such a laminated member is used on a TFT-side glass substrate as an alternative to a black matrix, sufficient shielding of light is not achieved, and therefore, the OD value decreases and contrast accordingly decreases.

On the other hand, as such a color filter for liquid crystal display in which three color layers are formed on a counter glass substrate described earlier, a color filter in which adjacent color layers are overlapped at their boundaries has been proposed (Japanese Patent Laid-Open Publication No Sho 63-173023). In the case of the color filter described in this official gazette, black ink is applied using a roller to the overlap portions described above to thereby form the black matrix. However, in such a color filter, since a light shielding rate becomes different depending on the color of the adjacent color layer, the contrast of a displayed image varies, and hence, the image appears uneven.

SUMMARY OF THE INVENTION

According to the present invention, a color liquid crystal display panel comprises first and second transparent substrates which are arranged to face each other, a liquid crystal layer provided between the first and the second transparent substrates, a plurality of thin film transistors provided on the first transparent substrate, an insulation film provided on the first transparent substrate so as to cover the thin film transistors, a color filter which comprises first to third color layers stacked on the insulation film, a contacting color layer which is provided on the insulation film in a region above the thin film transistors and comprises at least one color layer selected from the group consisting of the first to third color layers, and a black matrix which is provided on the contacting color layer and has opening portions for transmitting light from the color filter.

According to the present invention, a contacting color layer including at least one color layer selected from the group consisting of the first to third color layers is provided between the black matrix and the insulation film. As to the color layers, since light even passes through the inside of the color layers during fabrication of the color layers by photolithography, the color layer is sufficiently sensitized, and therefore, contact between the color layer and the insulation film is tight. As to the black matrix, high optical density is obtained since at least one of the color layers is disposed under the black matrix, and therefore, the black matrix can be formed to be thin. Moreover, since the base materials of the black matrix and the color layers are usually the same, e.g., an acrylic resin, contact between the color layers and the black matrix is also high. As a result, tight contact between the black matrix and the insulation film is achieved. Since this suppresses peeling of the black resin film, which serves as the raw material of the black matrix, fine patterning is possible during development, and high fineness is accordingly realized. In addition, since the color layers disposed under the black matrix as well serve as a light shielding layer in addition to the black matrix, high optical density is obtained.

BRIEF DESCRIPTION OF THE DRAWINGS

FIGS. 3A through 3G are cross sectional views showing a method of manufacturing the color liquid crystal display panel according to the embodiment of the present invention, in the sequence of manufacturing steps;

THE PREFERRED EMBODIMENTS OF THE INVENTION

Figure 1:
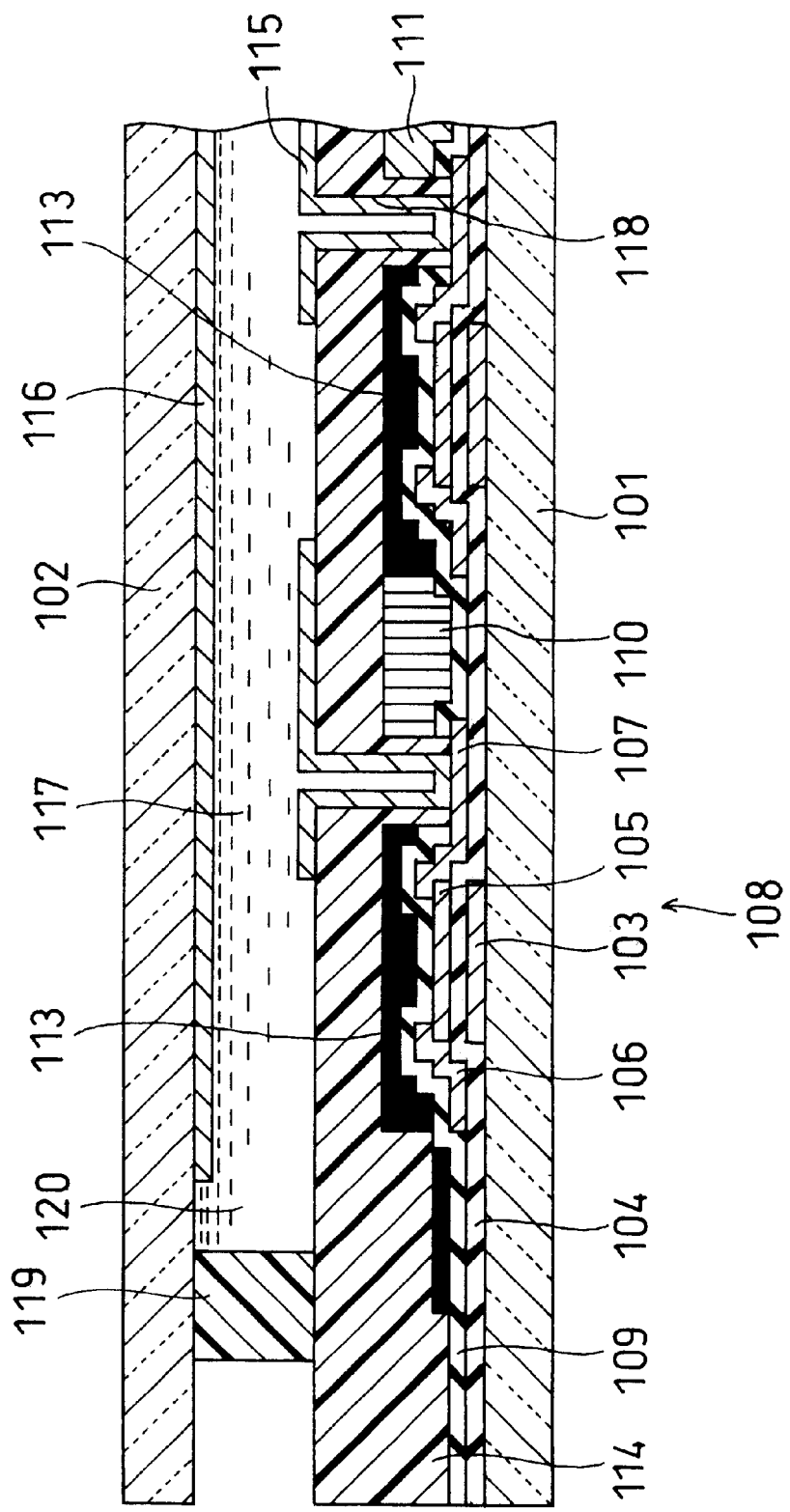
FIG. 1 is a cross sectional view of a conventional color liquid crystal display panel in which three color layers are formed on a TFT-side substrate.
Figure 2:
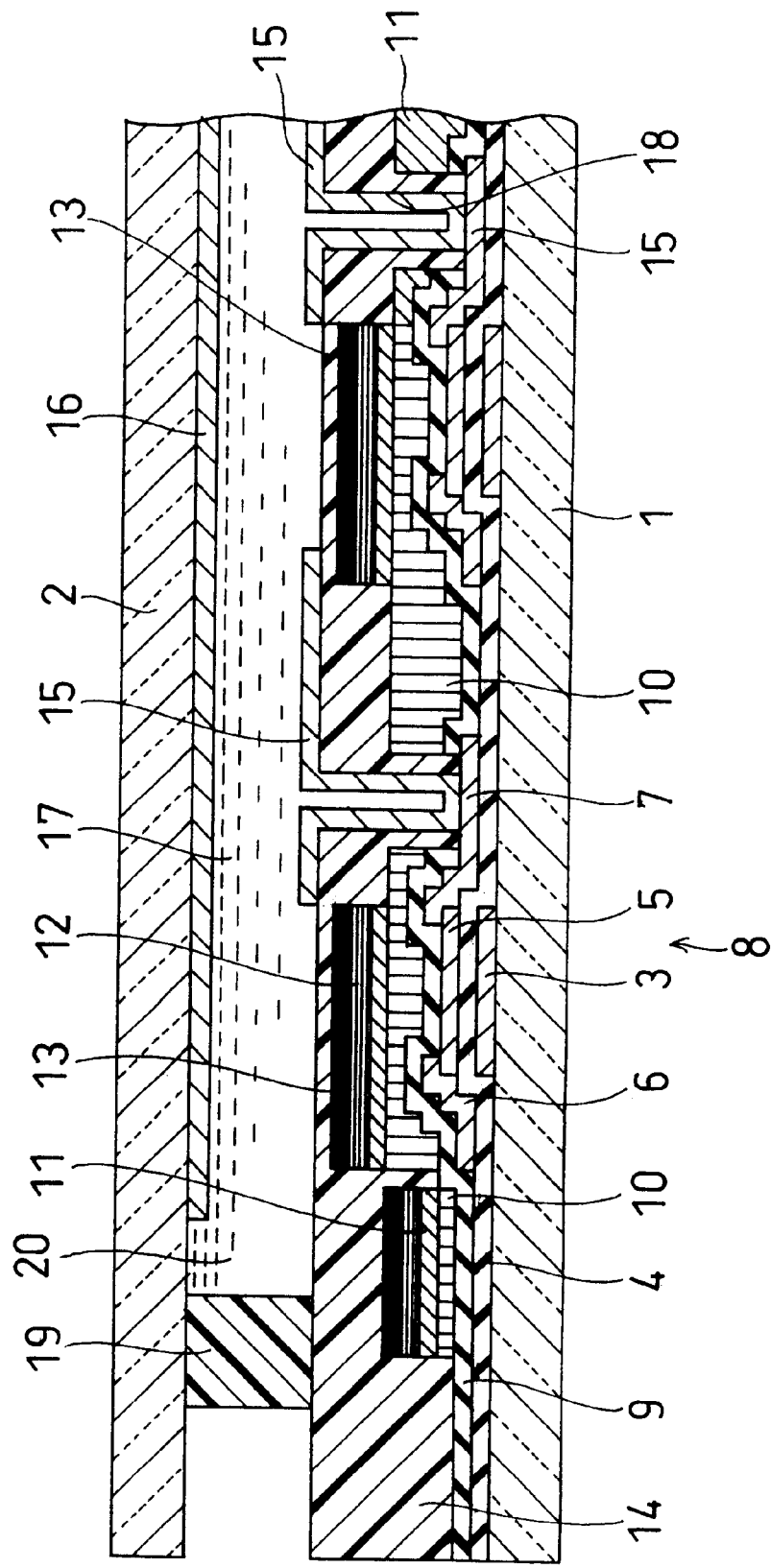
FIG. 2 is a cross sectional view showing a structure of a color liquid crystal display panel according to an embodiment of the present invention.

In the following, preferred embodiments of the present invention will be specifically described with reference to the attached drawings. FIG. 2 is a cross sectional view showing a structure of a color liquid crystal display panel according to an embodiment of the present invention.

In the color liquid crystal display panel according to the present embodiment, a liquid crystal layer 17 is disposed between a TFT-side glass substrate 1 and a counter glass substrate 2. In the following, the closer sides to the liquid crystal layer 17 of the glass substrates 1 and 2 will be referred to as "the inner sides" and the opposite sides will be referred to as "the outer sides."

A plurality of gate electrodes 3 are formed on the inner-side surface of the TFT-side glass substrate 1, and a gate insulation film 4 is formed so as to cover the gate electrodes 3. The gate electrodes 3 of a plurality of TFTs 8 which define rows are connected in common to gate lines (not shown) which extend in the row direction of the panel.

The gate insulation film 4 is formed of an $SiO_2$ film, for example. A semiconductor layer 5 is formed on an inner-side surface of the gate insulation film 4 at positions corresponding to the respective gate electrodes 3, and drain electrodes 6 and source electrodes 7 are formed so as to sandwich the semiconductor layer S. The drain electrodes 6 of a plurality of TFTs 8 which define columns are connected in common to signal lines (not shown) which extend in a column direction of the panel. Meanwhile, the source electrodes 7 are intrinsic to the respective TFTs 8. In this manner, the plurality of TFTs 8 are arranged in the form of a matrix. Further, an insulation film 9 is formed entirely over the inner-side surface of the TFT-side glass substrate 1 so as to coat the TFTs 8. The insulation film 9 is formed of silicon nitride, for example, which is not limiting.

A first color layer 10, a second color layer 11, a third color layer 12 and a black resin layer 13 are stacked from below in this order on the respective TFTs 8 so as to sandwich the insulation film 9 with them. Such a laminated member of the first to the third color layers 10 to 12 and the black resin layer 13 is formed on the respective gate lines, the respective signal lines and a frame portion 20 of the panel as well so as to sandwich the insulation film 9 with them. While the first to the third color layers 10 to 12 are respectively a red layer, a green layer and a blue layer in the present embodiment, the order in the color combination may be different from this. For instance, the first to the third color layers 10 to 12 are each obtained by dispersing particles which are appropriate as each color layer in an acrylic resin layer, while the black resin layer 13 is obtained by dispersing carbon particles in an acrylic resin layer. Any black resin layer 13 mentioned in the following will refer to a black matrix 13. In particular, a black matrix disposed to the frame portion 20 will specifically refer to a frame black matrix.

In addition, at inter-pixel opening portions from which the red light is to be emitted, the first color layer 10 alone is disposed on the insulation layer 9 as a color layer. At inter-pixel opening portions from which the green light is to be emitted, the second color layer 11 alone is disposed on the insulation layer 9 as a color layer. At inter-pixel opening portions from which the blue light is to be emitted (not shown), the third color layer 12 alone is disposed on t he insulation layer 9 as a color layer.

Further, on the inner-side surface of the TFT-side glass substrate 1, a flattened film 14 is formed which has a flattened surface and covers the laminated member of the first to the third color layers 10 to 12 and the black resin layer 13, the TFTs 8 and the like. A plurality of contact holes 18 are formed in the flattened film 14 such that the contact holes 18 reach the respective source electrodes 7 and pixel electrodes 15 of an ITO film, for example, are buried inside the contact holes 18 The pixel electrodes 15 protrude beyond and extend on the flattened film 14, thereby covering the color layers at the respective inter-pixel opening portions.

Meanwhile, a counter transparent common electrode 16 is formed on the inner-side surface of the counter glass substrate 2 such that the counter transparent common electrode 16 stretches to face the respective pixel electrodes 15. The counter transparent common electrode 16 is formed of an ITO film, for example.

A sealant 19 surrounding the liquid crystal layer 17 is disposed between the glass substrates 1 and 2. The sealant 19 is formed of an epoxy-base resin adhesive, for instance, which is not limiting. Further, an alignment film (not shown) is formed on each of the flattened film 14 and the counter transparent common electrode 16.

In the color liquid crystal display panel according to the present embodiment having such a structure as described above, the black matrix 13 is formed on the insulation film 9 sandwiching the first to the third color layers 10 to 12 with the insulation film 9. The first to the third color layers 10 to 12 are formed through patterning which uses a photo resist, for example, and therefore, due to a high photosensitivity and sufficient crosslinking, the first to the third color layers 10 to 12 exhibit a high contact capability with the insulation film 9, which is formed by silicon nitride, for example. In addition, since the base material of both the third color layer 12 and the black matrix 13 is an acrylic resin, contact between the third color layer 12 and the black matrix 13 is also excellent. Further, since the first to the third color layers 10 to 12 are formed as underlying layers to the black matrix 13, high optical density is obtained even if the black matrix 13 is thin, which allows the black matrix 13 to be formed as a thin film for the purpose of increasing a sensitizing rate inside. Hence, it is possible to achieve high contact between the black matrix 13 from easily falling off during fabrication of the black matrix 13 even when a fine pattern is used, it is possible to use a fine pattern for a highly fine panel. For instance, it is possible to pattern a black matrix over widths of approximately 10 $\mu$m, which attains an opening ratio of about 80% in an XGA panel.

Further, since the color layers 10 to 12 of the three colors are formed under the black matrix 13, variance in transmissivity due to the position of the black matrix 13 does not occur. This realizes a stable contrast. Still further, since the optical densities of the color layers 10 to 12 of the three colors are added to the optical density (OD (Optical Density) value) of the black matrix 13, high total optical density is obtained.

Figure 4:
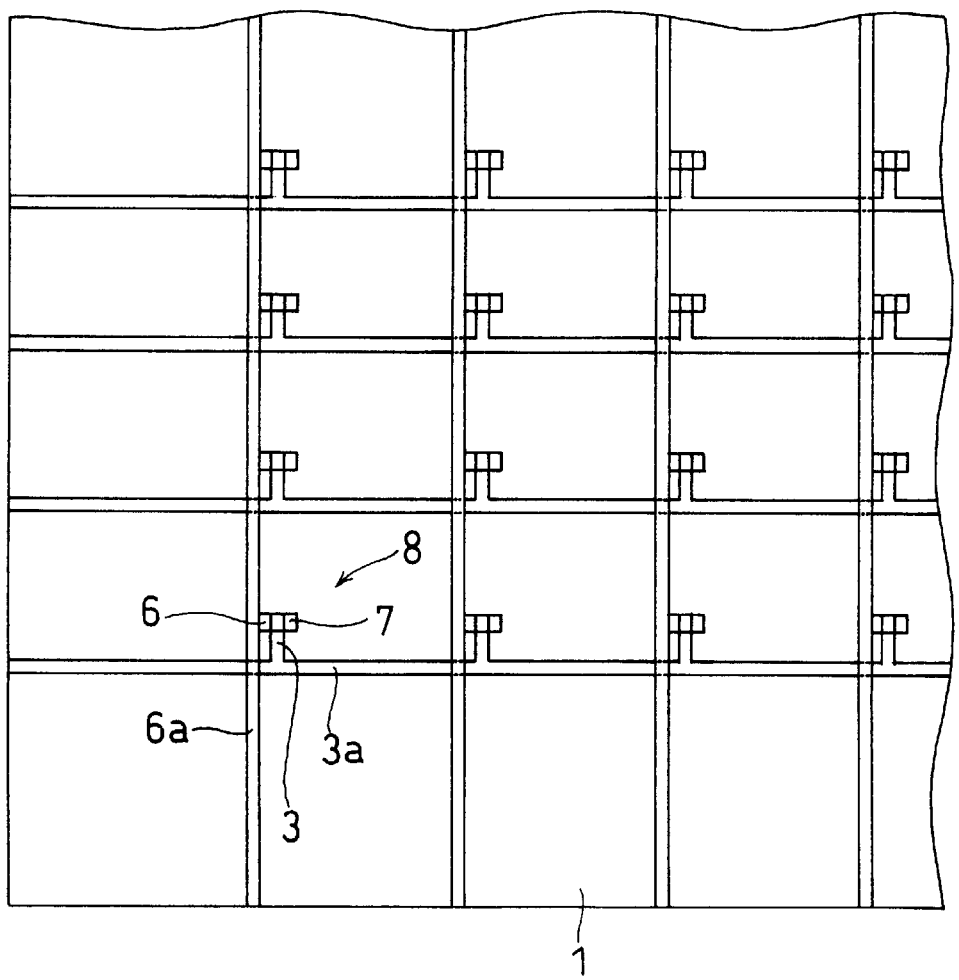
FIG. 4 is a plan view of the step shown in FIG. 3A.
Figure 5:
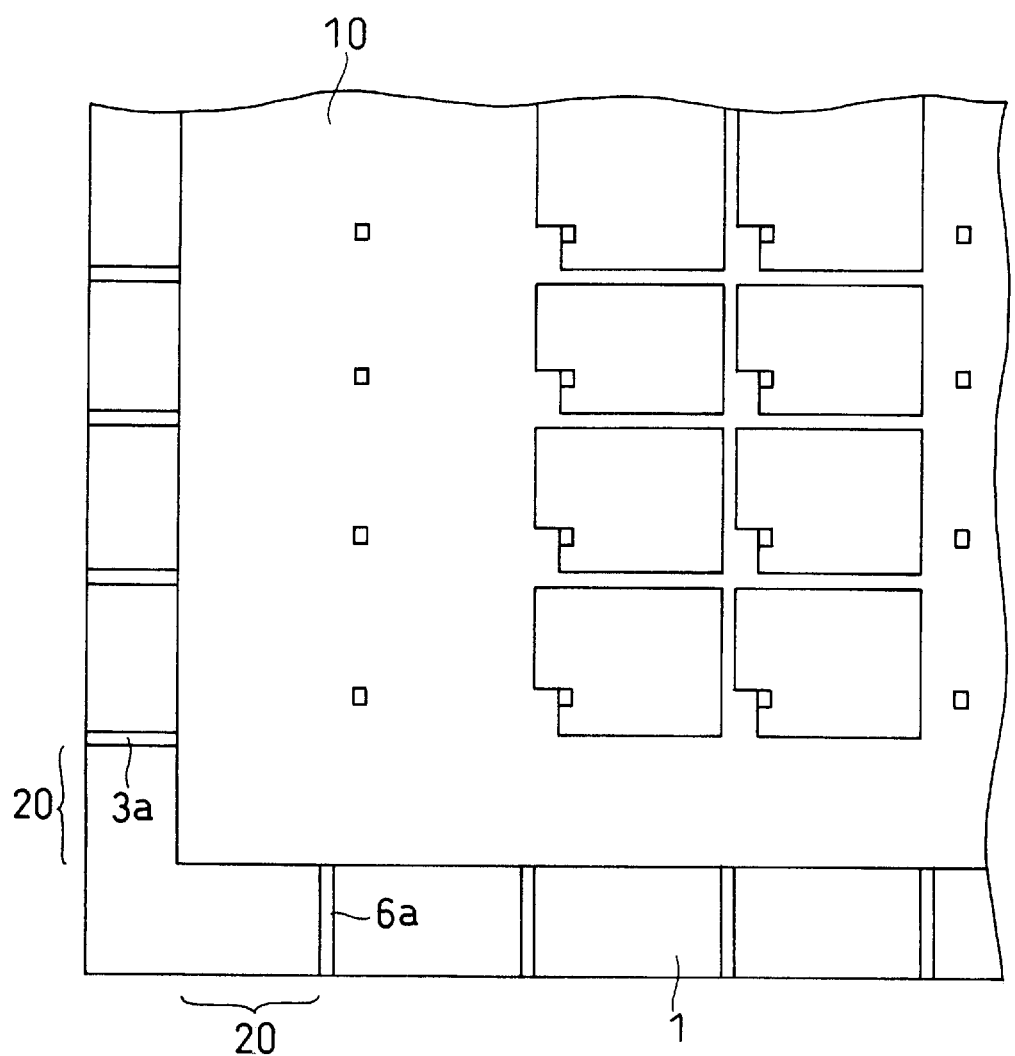
FIG. 5 is a plan view of the step shown in FIG. 3B.
Figure 6:
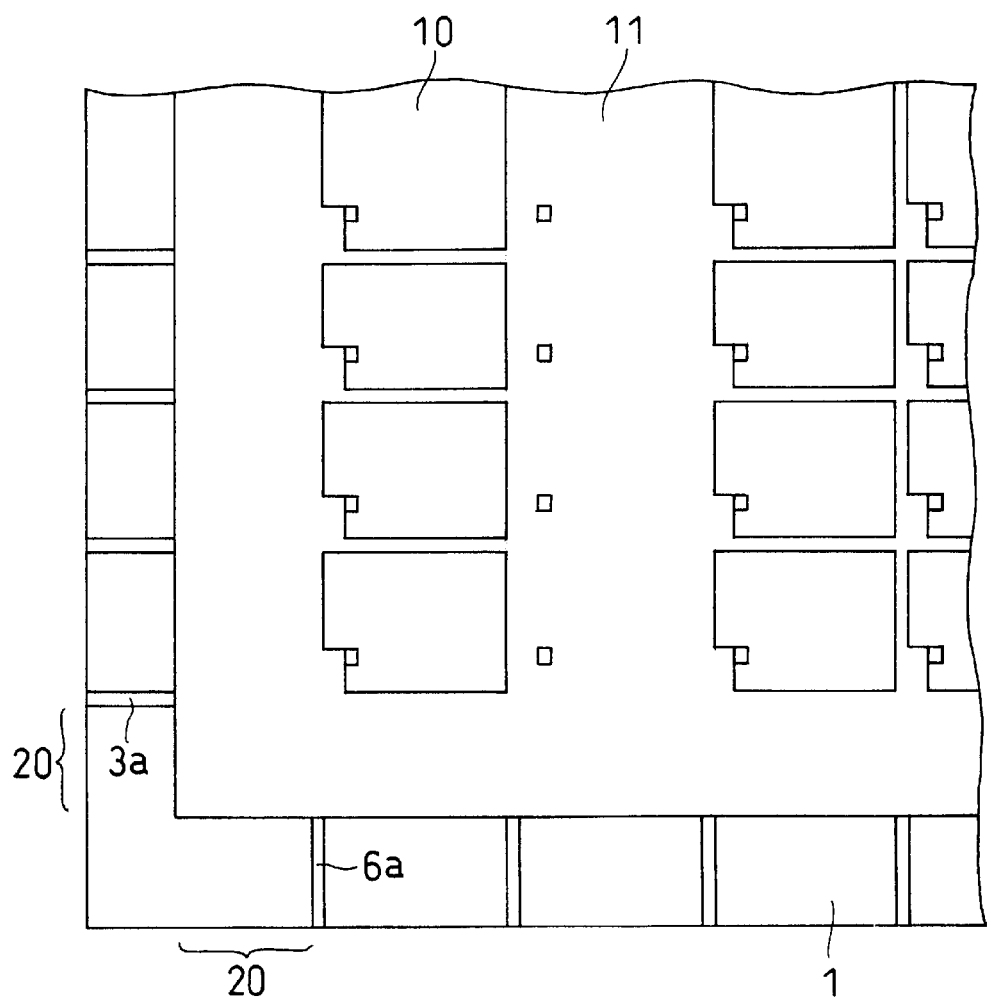
FIG. 6 is a plan view of the step shown in FIG. 3C.
Figure 7:
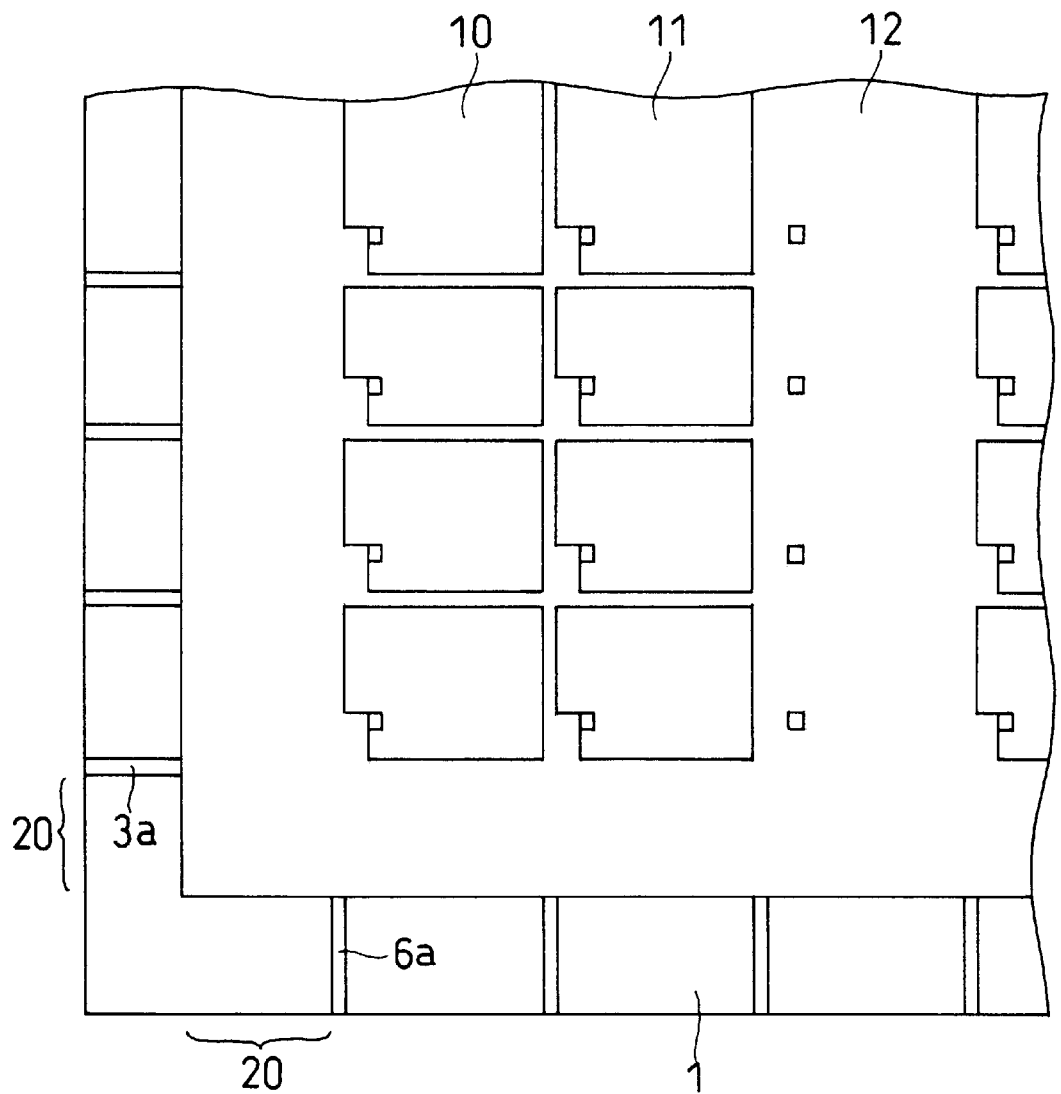
FIG. 7 is a plan view of the step shown in FIG. 3D.
Figure 8:
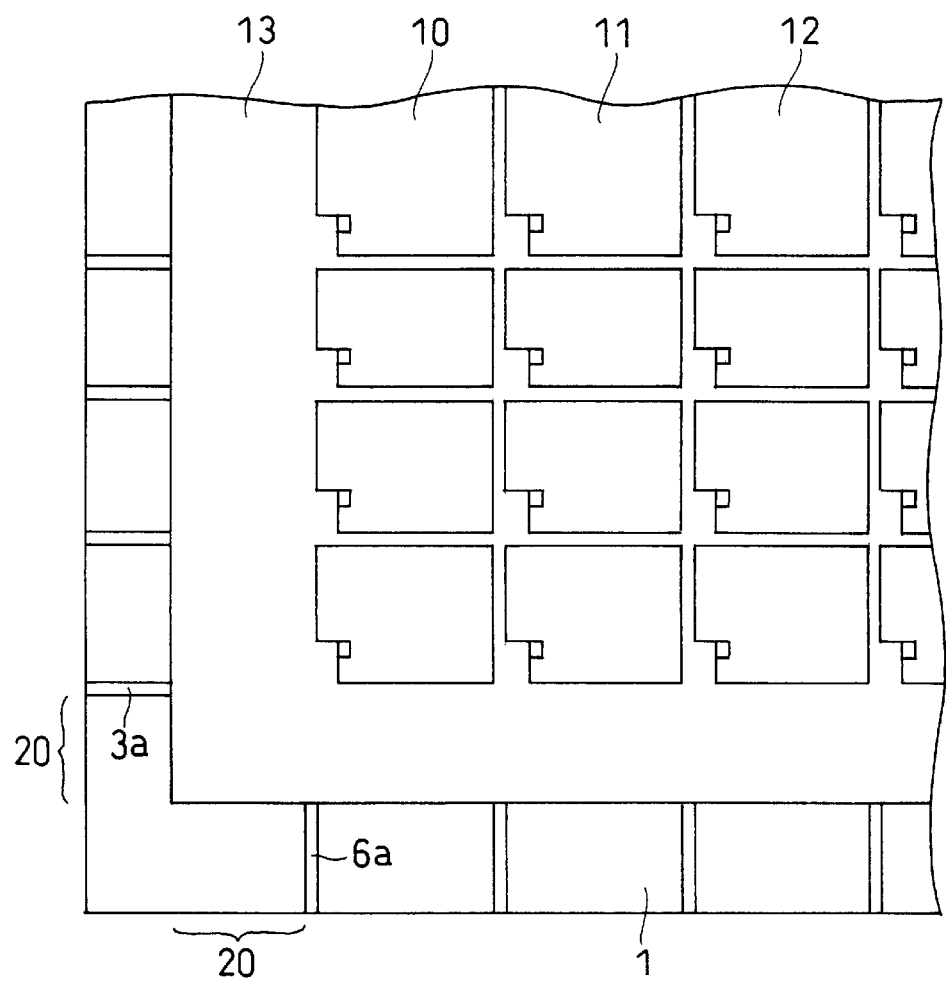
FIG. 8 is a plan view of the step shown in FIG. 3E.

Next, a method of manufacturing the color liquid crystal display panel according to the embodiment as above will be described. FIGS. 3A to 3G are cross sectional views showing the method of manufacturing the color liquid crystal display panel according to the embodiment, in the sequence of manufacturing steps. FIG. 4 is a plan view of the step shown in FIG. 3A. FIG. 5 is a plan view of the step shown in FIG. 3B. FIG. 6 is a plan view of the step shown in FIG. 3C. FIG. 7 is a plan view of the step shown in FIG. 3D. FIG. 8 is a plan view of the step shown in FIG. 3E. In FIGS. 3A to 3G through 8, the insulation film 4 and the like are omitted for the simplicity of illustration.

For fabrication of the color liquid crystal display panel as described above, first, as shown in FIGS. 3A and 4, the plurality of TFTs 8 are arranged in the form of a matrix on the TFT-side glass substrate 1. At this step, after forming the gate electrodes 3 and the gate lines 3a, the insulation film 4 is formed.

Next, the insulation film 9 is formed over the entire surface, and as shown in FIGS. 3B and 5, the first color layer 10 of the red color is formed on the insulation film 9 which is over the gate electrodes 3 and the drain electrodes 6 of the TFTs 8, the frame portion 20, the inter-pixel opening portions for emitting the red light, the gate lines 3a and the signal lines 6a. The base material of the first color layer 10 is an acrylic resin, and particles of the red color are dispersed inside the acrylic resin. The thickness of the first color layer 10 is 1 through 2 $\mu$m, for example.

Following this, as shown in FIGS. 3C and 6, the second color layer 11 of the green color is formed on the exposed insulation film 9 and the first color layer 10 of the red color which is over the gate electrodes 3 and the drain electrodes 6 of the TFTs 8, the frame portion 20, the inter-pixel opening portions for emitting the green light, the gate lines 3a and the signal lines 6a. The base material of the second color layer 11 is an acrylic resin, and particles of the green color are dispersed inside the acrylic resin. The thickness of the second color layer 11 in 1 through 2 $\mu$m, for example.

Figure 3D:
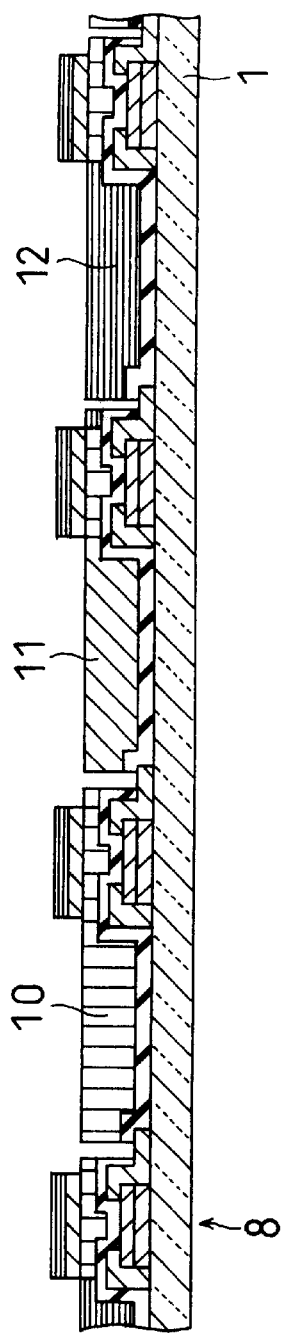

Further, as shown in FIGS. 3D and 7 the third color layer 12 of the blue color is formed on the exposed insulation film 9 and the second color layer 11 of the green color which is over the gate electrodes 3 and the drain electrodes 6 of the TFTs 8, the frame portion 20, the inter-pixel opening portions for emitting the blue light, the gate lines 3a and the signal lines 6a. The base material of the third color layer 12 is an acrylic resin, and particles of the blue color are dispersed inside the acrylic resin. The thickness of the third color layer 12 is 1 through 2 $\mu$m, for example.

Figure 3E:
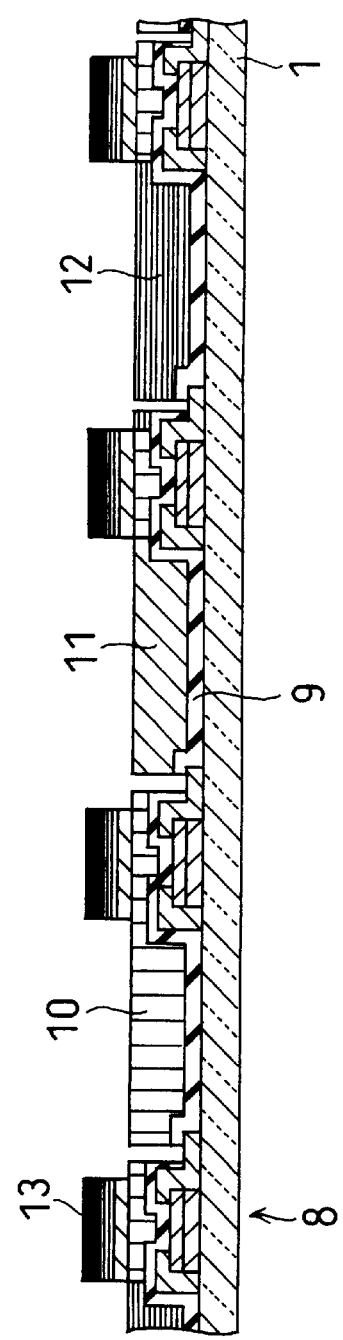

As shown in FIGS. 3E and 8, the black matrix 13 is thereafter formed on the third color layer 11 which is over the gate electrodes 3 and the drain electrodes 6 of the TFTs 8, the frame portion 20, the gate lines 3a and the signal lines 6a. The thickness of the black matrix 13 is 1 through 2 $\mu$m, for example.

Following this, as shown in FIG. 3F, the flattened film 14 is formed over the entire surface, and the contact holes 18 which reach the respective source electrodes 7 are formed in the flattened film 14.

Next, as shown in FIG. 3G, the pixel electrodes 15, which protrude beyond and extend on the flattened film 14 so as to cover the color layers at the respective inter-pixel opening portions on the flattened film 14, is formed inside the contact holes 18 and on the flattened film 14.

After this, by a normal method, the counter transparent common electrode 16 is formed on the counter glass substrate 2 and these substrates are bonded to each other or otherwise appropriately adhered to each other, whereby the color liquid crystal display panel is completed.

Although the three color layers 10 to 12 are disposed between the black matrix 13 and the insulation film 9 according to the embodiment described above, the number of the color layers may be one or two, in which case the colors of the color layers are not limited. However, in order to obtain stable contrast in the entire panel, it is necessary that the combination of the color layers which are disposed between the black matrix 13 and the insulation film 9 is constant. Thus, even though one or two color layers are disposed between the black matrix 13 and the insulation film 9, it is possible to achieve high contact and high contrast. For instance, where one color layer is disposed, the thickness of the black matrix 13 is preferably 3 through 4 μm.

Figure 9:
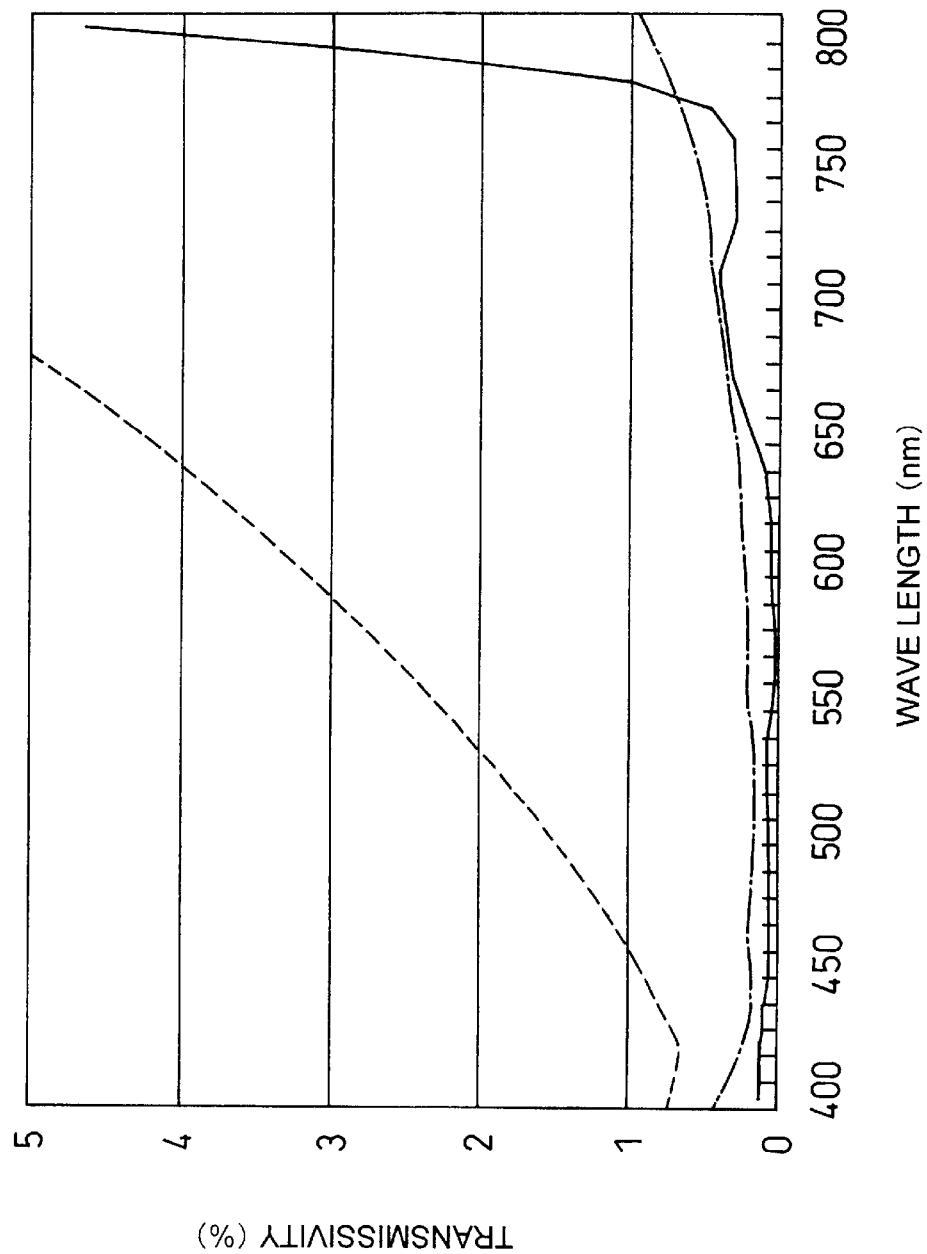
FIG. 9 is a graph showing the relationships between wavelength and transmissivity in various cases including where two color layers and a black matrix are formed.
Figure 10:
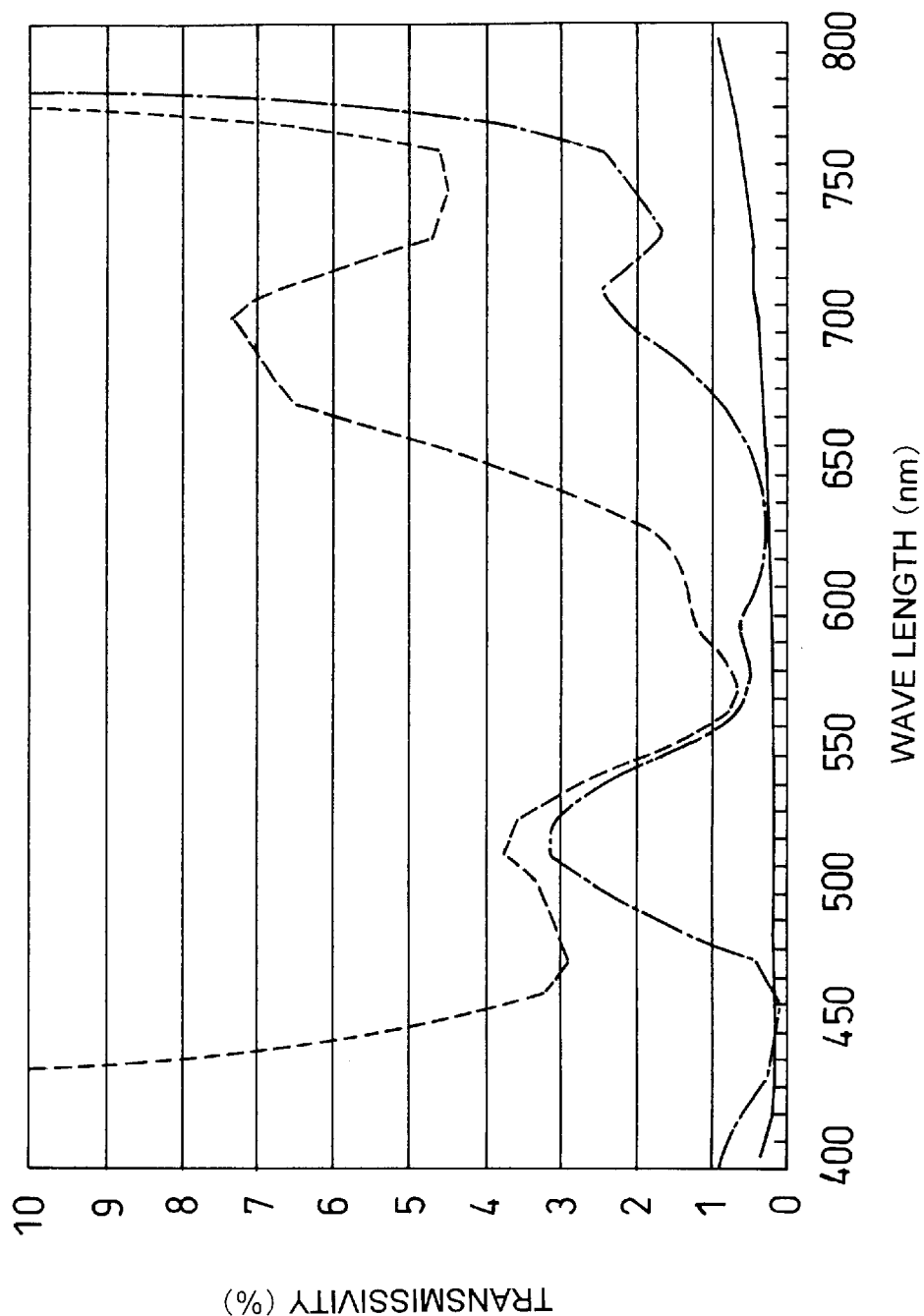
FIG. 10 is a graph showing the relationships between wavelength and transmissivity in various cases including where only two color layers are formed.

FIG. 9 is a graph showing relationships between a wavelength and a transmissivity in various cases, including one where two color layers and a black matrix are formed, with the wavelength measured along the horizontal axis and the transmissivity measured along the vertical axis. FIG. 10 is a graph showing relationships between wavelength and transmissivity in various cases, including one where only two color layers are formed, with the wavelength measured along the horizontal axis and the transmissivity measured along the vertical axis. In FIG. 9, the solid line denotes where two color layers and a black matrix whose OD value is 1.6 are disposed (which corresponds to the embodiment above of the present invention), the chain line denotes where only a black matrix whose OD value is 3 is disposed, and the broken line denotes where only a black matrix whose OD value is 1.6 is disposed. In FIG. 10, the solid line denotes where only a black matrix whose OD value is 3 is disposed, the chain line denotes where only three color layers are disposed, and the broken line denotes where only two color layers are disposed. As shown in FIGS. 9 and 10, where two color layers and a black matrix are disposed, the transmissivity is extremely low as compared with the other cases. The color layers used where two color layers are disposed shown in FIGS. 9 and 10 are a combination of a red color layer and a blue color layer.

Further, the inventor of the present invention actually confirmed margins of the black resin film during development, and obtained the results shown in Tables 1 and 2 below. Table 1 shows the result corresponding to where the first to the third color layers and the black resin film are sequentially deposited on a silicon nitride film, whereas Table 2 shows the results corresponding to where the black resin film is deposited directly on a silicon nitride film. In Tables 1 and 2, "A" indicates that the black resin film did not fall off or fail to be developed, "B" indicates that the black resin film partially fell off and/or failed to be developed, "C" indicates that the black resin film fell off or could not be developed. A central value D of pH value is 10 through 11, and a central time T is 60 through 120 seconds.

TABLE 1

| Developing time (Sec) | pH value of developing solution ||||| 
|---|---|---|---|---|---|
| | D − 0.2 | D − 0.1 | Central value D | D + 0.1 | D + 0.2 |
| T-40 | C | C | B | B | B |
| T-20 | C | B | A | A | B |
| Central time T | B | A | A | A | B |
| T + 20 | B | A | A | B | C |
| T + 40 | B | B | B | C | C |

TABLE 2

| Developing time (Sec) | pH value of developing solution ||||| 
|---|---|---|---|---|---|
| | D − 0.2 | D − 0.1 | Central value D | D + 0.1 | D + 0.2 |
| T-40 | C | C | C | C | C |
| T-20 | C | C | B | C | C |
| Central time T | C | B | B | C | C |
| T + 20 | C | C | C | C | C |
| T + 40 | C | C | C | C | C |

While the base material of the black matrix and the color layers is an acrylic resin in the embodiment above, other resin such as a polyimide resin may be used.

What is claimed is:

1. A color liquid crystal display panel comprising:
   first and second transparent substrates which are arranged to face each other,
   a liquid crystal layer provided between said first and second transparent substrates;
   a plurality of thin film transistors provided on said first transparent substrate;
   an insulation film provided on said first transparent substrate so as to cover said thin film transistors;
   a color filter which comprises first to third color layers stacked on said insulation film;
   a contacting color layer formed of an acrylic resin base material which is provided on said insulation film in a region above said thin film transistors and comprises at least one color layer selected from the group consisting of said first to third color layers; and
   a black matrix also formed of an acrylic resin base material which is provided on and in direct contact with said contacting color layer and has opening portions for transmitting light from said color filter.

2. The color liquid crystal display panel according to claim 1, wherein the number of said color layers in said contacting color layer is one, and the color of that color layer is coordinated all over said first transparent substrate.

3. The color liquid crystal display panel according to claim 2, wherein said black matrix comprises an acrylic resin portion which serves as a base material and carbon particles which are dispersed inside said acrylic resin portion.

4. The color liquid crystal display panel according to claim 1, wherein the number of said color layers in said contacting color layer is two, and the combination of the colors of these color layers is coordinated all over said first transparent substrate.

5. The color liquid crystal display panel according to claim 4, wherein said black matrix comprises an acrylic resin portion which serves as a base material and carbon particles which are dispersed inside said acrylic resin portion.

6. The color liquid crystal display panel according to claim 1, wherein the number of said color layers in said contacting color layer is three.

7. The color liquid crystal display panel according to claim 6, wherein said black matrix comprises an acrylic resin portion which serves as a base material and carbon particles which are dispersed inside said acrylic resin portion.

8. The color liquid crystal display panel according to claim 1, wherein said black matrix comprises an acrylic resin portion which serves as a base material and carbon particles which are dispersed inside said acrylic resin portion.

9. The color liquid crystal display panel according to claim 1, wherein said color layer in said contacting color layer is formed at the same time with said color layer in said color filter.

10. The color liquid crystal display panel according to claim 1, wherein said insulation film is a silicon nitride film.

11. A color liquid crystal display panel comprising:
- first and second transparent substrates which are arranged to face each other;
- a liquid crystal layer provided between said first and said second transparent substrates;
- a plurality of thin film transistors provided on said first transparent substrate;
- an insulation film provided on said first transparent substrate so as to cover said thin film transistors;
- a color filter which comprises first to third color layers stacked on said insulation film;
- a contacting color layer formed of a polyimide resin base material which is provided on said insulation film in a region above said thin film transistors and comprises at least one color layer selected from the group consisting of said first to third color layers; and
- a black matrix also formed of a polyimide resin base material which is provided on and in direct contact with said contacting color layer and has opening portions for transmitting light from said color filter.

12. The color liquid crystal display panel according to claim 11, wherein the number of said color layers in said contacting color layer is one, and the color of that color layer is coordinated all over said first transparent substrate.

13. The color liquid crystal display panel according to claim 12, wherein said black matrix comprises a polyimide resin portion which serves as a base material and carbon particles which are dispersed inside said polyimide resin portion.

14. The color liquid crystal display panel according to claim 11, wherein the number of said color layers in said contacting color layer is two, and the combination of the colors of these color layers is coordinated all over said first transparent substrate.

15. The color liquid crystal display panel according to claim 14, wherein said black matrix comprises a polyimide resin portion which serves as a base material and carbon particles which are dispersed inside said polyimide resin portion.

16. The color liquid crystal display panel according to claim 11, wherein the number of said color layers in said contacting color layer is three.

17. The color liquid crystal display panel according to claim 16, wherein said black matrix comprises a polyimide resin portion which serves as a base material and carbon particles which are dispersed inside said polyimide resin portion.

18. The color liquid crystal display panel according to claim 11, wherein said black matrix comprises a polyimide resin portion which serves as a base material and carbon particles which are dispersed inside said polyimide resin portion.

19. The color liquid crystal display panel according to claim 11, wherein said color layer in said contacting color layer is formed at the same time with said color layer in said color filter.

20. The color liquid crystal display panel according to claim 11, wherein said insulation film is a silicon nitride film.

* * * * *

UNITED STATES PATENT AND TRADEMARK OFFICE
CERTIFICATE OF CORRECTION

PATENT NO. : 6,445,432 B2
DATED : January 18, 2001
INVENTOR(S) : Yamamoto et al.

It is certified that error appears in the above-identified patent and that said Letters Patent is hereby corrected as shown below:

Column 4,
Line 36, "S" should be -- 5 --.

Column 8,
Line 19, "," (comma) should be -- ; -- (semic-colon).

Signed and Sealed this

Twenty-eighth Day of October, 2003

JAMES E. ROGAN
*Director of the United States Patent and Trademark Office*